United States Patent
Cheong et al.

(10) Patent No.: US 10,025,427 B2
(45) Date of Patent: Jul. 17, 2018

(54) PROBABILISTIC TOUCH SENSING

(71) Applicant: MICROSOFT TECHNOLOGY LICENSING, LLC, Redmond, WA (US)

(72) Inventors: Yuenkeen Cheong, Sammamish, WA (US); Michael Bohan, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/318,248

(22) Filed: Jun. 27, 2014

(65) Prior Publication Data
US 2015/0378510 A1 Dec. 31, 2015

(51) Int. Cl.
G06F 3/041 (2006.01)
G06F 3/0481 (2013.01)
G06F 3/0488 (2013.01)
G06F 3/0484 (2013.01)
G06F 3/0354 (2013.01)

(52) U.S. Cl.
CPC ........ *G06F 3/0418* (2013.01); *G06F 3/03545* (2013.01); *G06F 3/0412* (2013.01); *G06F 3/0416* (2013.01); *G06F 3/0488* (2013.01); *G06F 3/04812* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 6,040,824 | A | * | 3/2000 | Maekawa .......... G01C 21/3614 345/173 |
| 7,106,311 | B2 | | 9/2006 | Tsang |
| 8,004,503 | B2 | | 8/2011 | Zotov et al. |
| 8,164,582 | B2 | | 4/2012 | North et al. |
| 8,619,043 | B2 | | 12/2013 | Griffin et al. |
| 2008/0094376 | A1 | | 4/2008 | Dietz |
| 2008/0100586 | A1 | | 5/2008 | Smart |
| 2011/0086674 | A1 | * | 4/2011 | Rider .................... G06F 3/0416 455/566 |

(Continued)

OTHER PUBLICATIONS

ISA European Patent Office, International Search Report and Written Opinion issued in PCT Application No. PCT/US2015/037308, dated Oct. 28, 2015, WIPO, 9 pages.

(Continued)

*Primary Examiner* — David D Davis
(74) *Attorney, Agent, or Firm* — Alleman Hall Creasman & Tuttle LLP

(57) ABSTRACT

Embodiments are disclosed that relate to adjusting touch inputs on a computing device. For example, one disclosed embodiment provides a method of operating a touch-sensitive display of a computing device comprising displaying a graphical user interface on the touch-sensitive display, receiving a touch input via a touch sensor of the touch-sensitive display at a sensed location, performing a probabilistic determination of an intended touch location based on the input, and displaying a response to the input at an adjusted location on the graphical user interface that is adjusted relative to the sensed location based upon the probabilistic determination.

20 Claims, 8 Drawing Sheets

(56) References Cited

U.S. PATENT DOCUMENTS

| | | |
|---|---|---|
| 2011/0238612 A1 | 9/2011 | Wilson |
| 2012/0169646 A1 | 7/2012 | Berkes et al. |
| 2013/0154957 A1 | 6/2013 | Locker et al. |
| 2013/0321301 A1* | 12/2013 | Takeichi ................. G06F 3/041 345/173 |

OTHER PUBLICATIONS

Fitts, et al., "The Information Capacity of Discrete Motor Responses", In Journal of Experimental Psychology, vol. 67, No. 2, Feb. 1964, pp. 103-112.

Lee, et al., "PhantomPen: Virtualization of Pen Head for Digital Drawing Free Form Pen Occlusion and Visual Parallax", In Proceedings of the 25th Annual ACM Symposium on User Interface Software and Technology, Oct. 7, 2012, 10 pages.

Ramos, et al., "Pointing Lenses: Facilitating Stylus Input Through Visual- and Motor-Space Magnification", In Proceedings of the SIGCHI Conference on Human Factors in Computing Systems, Apr. 29, 2007, pp. 757-766.

Vogel, Daniel, "Direct Pen Input and Hand Occlusion", In Doctoral Thesis, Sep. 1, 2010, 303 pages.

Grossman, E.R.F.W. et al. (1983) Feedback control of hand-movement and Fitts' Law: Communication to the experimental society. Quarterly Journal of Experimental Psychology, 35A, 251-278.

IPEA European Patent Office, Second Written Opinion Issued in Application No. PCT/US2015/037308, dated May 11, 2016, WIPO, 6 Pages.

IPEA European Patent Office, International Preliminary Report on Patentability Issued in Application No. PCT/US2015/037308, dated Sep. 8, 2016, WIPO, 7 Pages.

\* cited by examiner

PROBABILISTIC TOUCH SENSING

BACKGROUND

A touch-sensitive computing device may utilize a touch sensor and a display device to enable user interaction with a graphical user interface. Touch sensors may utilize any of a number of technologies to detect touch inputs, including capacitive, resistive and optical technologies. Likewise, users may make inputs with various different touch input probes, such as one or more styluses and/or human digits.

SUMMARY

Embodiments are disclosed that relate to utilizing probabilistic determinations to adjust sensed touch input locations in touch input systems. For example, one disclosed embodiment provides a method of operating a touch-sensitive display of a computing device. The method includes displaying a graphical user interface on the touch-sensitive display, receiving a touch input via a touch sensor of the touch-sensitive display at a sensed location, performing a probabilistic determination of an intended touch location based on the input, and displaying a response to the input at an adjusted location on the graphical user interface that is adjusted relative to the sensed location based upon the probabilistic determination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, touch-sensitive computing devices may receive input via an input device such as a human digit or stylus. During a touch input, a difference between a location at which input is applied to the computing device and a location at which the input is sensed by the computing device may arise. Various factors may contribute to this effect, which is referred to herein as parallax regardless of the origin of the difference.

Figure 1A:
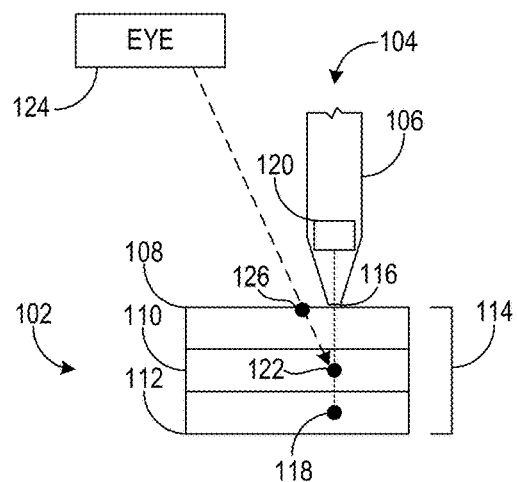
FIGS. 1A-C schematically illustrate examples of parallax that may arise during use of a touch sensing system.
Figure 1B:
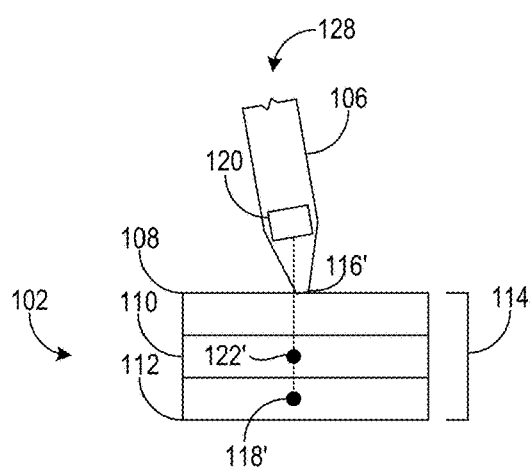
Figure 1C:
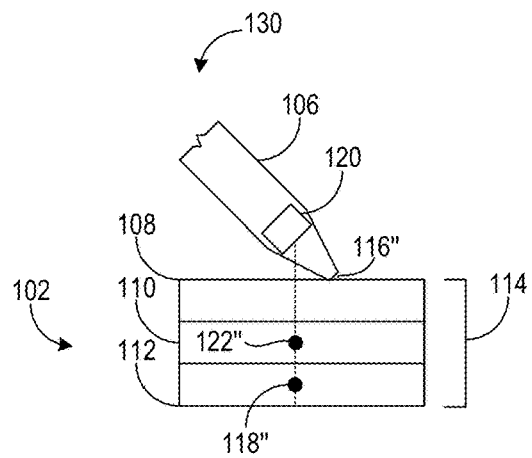

FIGS. 1A-C schematically illustrate a touch sensitive display 102 of a computing device, and illustrate examples of how such parallax may arise. Touch-sensitive display 102 comprises a cover sheet 108 (e.g. glass), a display 110 (e.g. an LCD or OLED display), and a touch sensor 112 (e.g. a capacitive or resistive sensor) that together form a combined display and touch-sensing stack 114. It will be understood that the touch sensor may be located between the cover sheet and the display in some implementations.

As a first example of parallax, FIG. 1A shows, at 104, stylus 106 making contact at a physical location 116, and being sensed by touch sensor 112 at a sensed location 118. In the example at 104, sensed location 118 corresponds to physical location 116, as a sensing element 120 disposed in stylus 106 and used by a capacitive touch sensor to sense touch is vertically aligned with the tip of the stylus where physical contact takes place. As such, display 110 displays a response to the touch input at a displayed location 122 that corresponds to physical location 116. While displayed response to the touch at 104 is at a correct location, it will be noted that the user 124 perceives the physical location of a response displayed to the touch input as being at a perceived location 126 that is offset from displayed location 122, due to the oblique angle of the user's eye relative to the surface of stack 114. This type of parallax is referred to herein as "visual" parallax, and may cause a user to make touch inputs at incorrect locations.

As another example of parallax, as indicated at 128 in FIG. 1B, sensing element 120 is not vertically aligned with a physical location 116' of the touch input due to the angular orientation of stylus 106 relative to the surface of the cover sheet. Consequently, touch sensor 112 senses the touch input at a sensed location 118' that differs from physical location 116', and that also differs from a displayed location 122' of a user interface element (e.g. a cursor, inking, etc.) that is displayed in response to the sensed touch input. This type of parallax is referred to herein as "hardware" parallax. This difference may be exacerbated as the angle between the stylus and a surface plane of cover sheet 108 decreases. An example of this is shown at 130 in FIG. 1C, where a relatively larger difference between a physical touch location 116" and a sensed location 118" arises due to the angular orientation of the stylus, and a relatively larger discrepancy results between physical location 116" and displayed location 122" of a UI element.

Touch input systems may attempt to correct for hardware parallax via calibration to determine an offset to apply to sensed touch inputs. However, such compensation may not be effective for different stylus contact angles.

Visual and/or hardware parallax may cause various issues, such as the erroneous selection of user interface elements contrary to a user's intent. To mitigate such issues, a computing device may display visual cues, such as a cursor, crosshair, etc. to illustrate the sensed location to a user. However, visual cues may occlude user interface elements displayed by the display, and may introduce latency as the cues lag behind motion of stylus 106, which may degrade the user experience. Calibrated fixed offsets also may be applied to correct touch locations. However, the use of calibrated offsets to apply to touch inputs, instead of visual cues, may not adequately compensate for variations in the angular orientation of stylus 106, as described above.

Figure 2A:
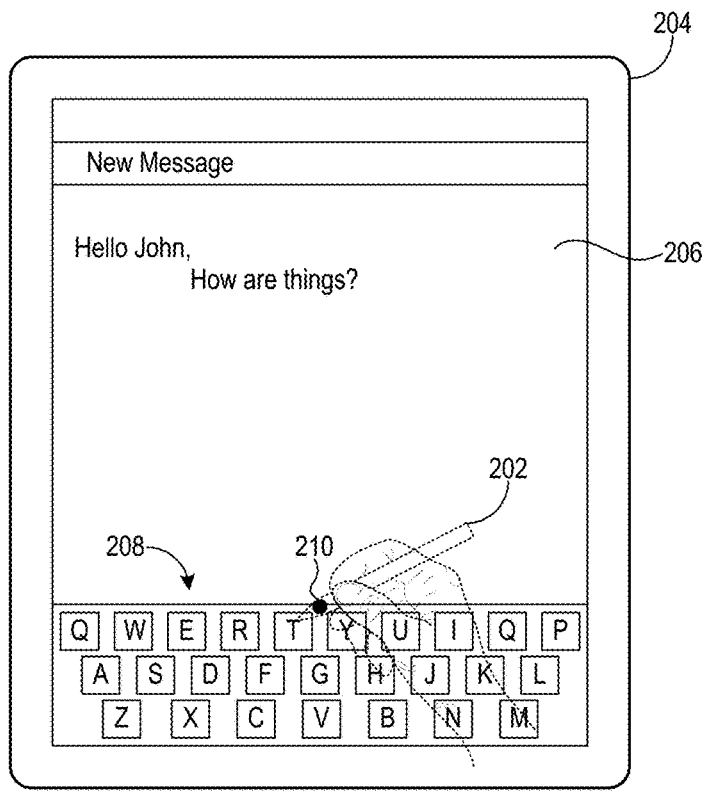
FIGS. 2A and 2B show an example adjustment made to a sensed touch location based upon a probabilistic determination of a likely intended touch location.
Figure 2B:
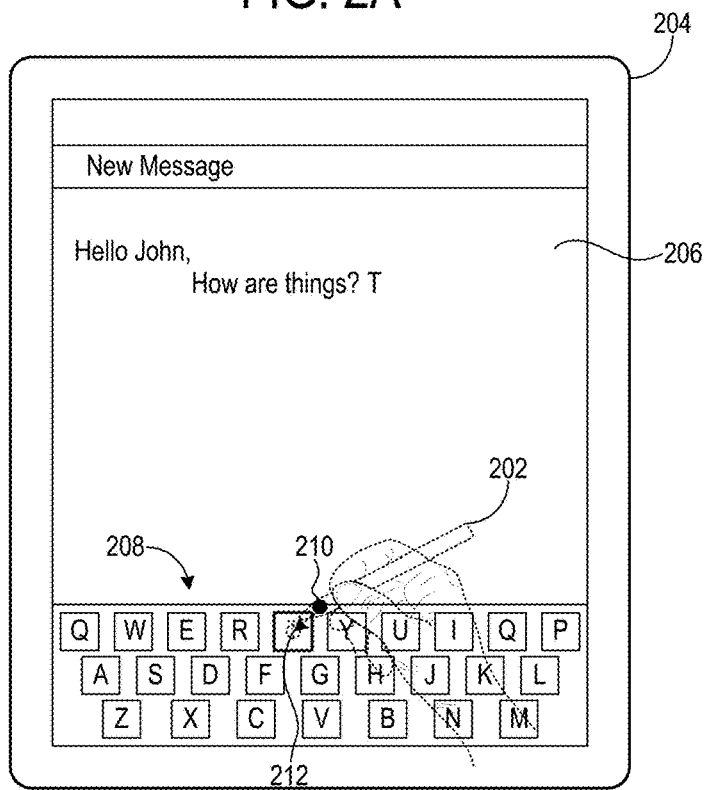

Accordingly, examples are disclosed herein that probabilistically determine an intended touch location based upon a sensed location of a touch input. The examples described herein may mitigate parallax arising in the course of application of touch input without displaying visual cues that degrade the user experience. FIGS. 2A and 2B illustrate an example adjustment of a sensed touch location in accordance with an implementation of this disclosure. As shown in FIG. 2A, touch input is applied by a stylus 202 to a touch-sensitive computing device 204. While computing device 204 is shown in the form of a tablet computing device, it will be appreciated that any other suitable forms of computing devices are within the scope of this disclosure.

Computing device 204 includes a display 206 displaying a graphical user interface (GUI) including a virtual keyboard 208 that, based on touch input received from stylus 202, may produce text on the display, for example in a word processing or email application running on the computing device. As shown, the stylus tip physically touches the touch-sensitive display within the boundaries of the displayed "T" key. However, due to hardware parallax, the touch input is sensed at a location between the "Y" and "T" keys. Thus, to determine which of the proximate keys the user likely intended to select, computing device 204 may include instructions that are executable to perform a probabilistic determination of the intended touch location based on the sensed location of the touch input. Example hardware implementations of computing device 204 are described below with reference to FIG. 8.

FIG. 2B illustrates a response that may be displayed based upon the performance of the probabilistic determination. In this figure, it can be seen that the "T" key of the displayed keyboard is selected based upon a determination that a likely intended touch location was within the borders of the "T" key.

The probabilistic determination may utilize any suitable information to determine the likely intended touch location. For example, the probabilistic determination may utilize as inputs the sensed location 210 of the touch input, the locations of one or more user interface elements displayed when the touch input is received (e.g. the 'T' and 'Y' keys of FIGS. 2A and 2B), and also a set of previously determined dispersion of touch locations around an intended touch location.

The probabilistic determination may include determining respective probabilities of the touch input being intended for two or more of the user interface elements. For example, probabilities for keys of virtual keyboard 208 within a threshold distance from sensed location 210 may be determined In the depicted example, the 'T' and 'Y' may be considered possibly intended touch locations. Accordingly, probabilistic determinations for each of these keys may be performed by determining respective distances (e.g. in x and y directions) between the keys and sensed location 210. It will be understood that any suitable calculation or calculations may be utilized to determine the probability or probabilities of likely intended touch locations, and that in some implementations different probabilistic functions may be utilized in different instances.

In the example shown in FIG. 2B, the probabilistic determination performed for the 'T' key in this instance yields a probability higher than that yielded by the probabilistic determination for the 'Y' key. As such, the 'T' key is selected as the intended touch location based upon the probabilistic determinations. In this example, the 'T' key is closer to the sensed location than the 'Y' key. However, in some instances, a key that is farther from the sensed location may be determined to be the more probable, depending upon the nature of the statistical distribution used, the relative positions of the sensed touch location compared to user interface elements, the probabilistic function used to determine the probabilities, and potentially other factors.

The result of the probabilistic determination in this instance is the application of an offset of the sensed location to an adjusted location (e.g. a location within the boundaries of the 'Y' key). As opposed to methods which apply a fixed, calibrated offset to touch inputs, the offset in this instance is dynamically determined, and may change in both magnitude and direction between touch inputs. Further, the adjustment may be determined based upon one or more user interface elements displayed when the touch input is received.

As mentioned above, in some implementations a threshold condition may be applied to a user interface element when determining whether a sensed touch input may have been intended for the element. For example, a threshold minimum probability, a threshold maximum distance, and/or other threshold conditions may be applied. In the event that no user interface elements meet any applied threshold conditions, the response to the touch input may be instead displayed at the sensed location, or a probabilistic determination may still be utilized to determine an offset to apply.

Figure 3A:
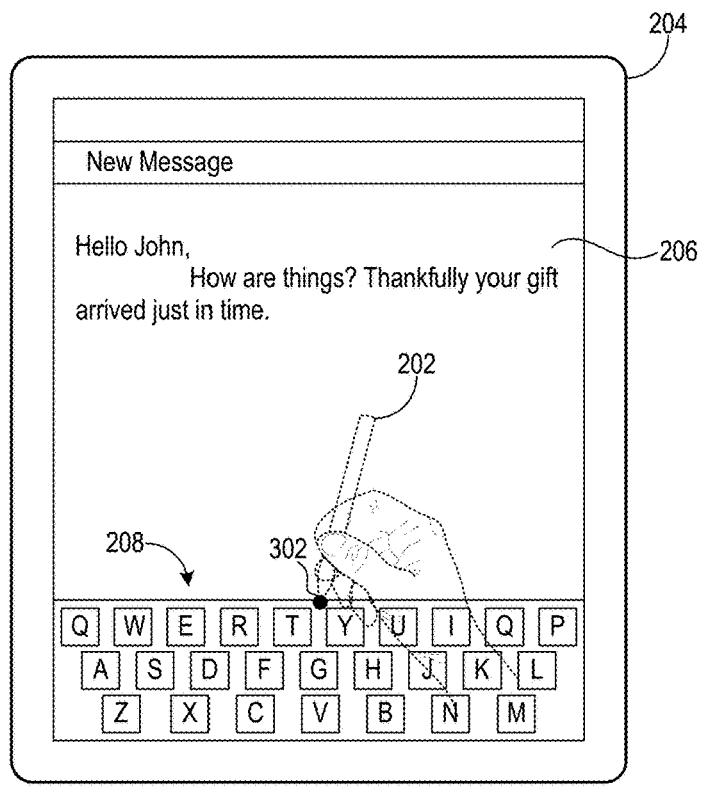
FIGS. 3A and 3B show another example adjustment made to a sensed touch location based upon a probabilistic determination of a likely intended touch location.
Figure 3B:
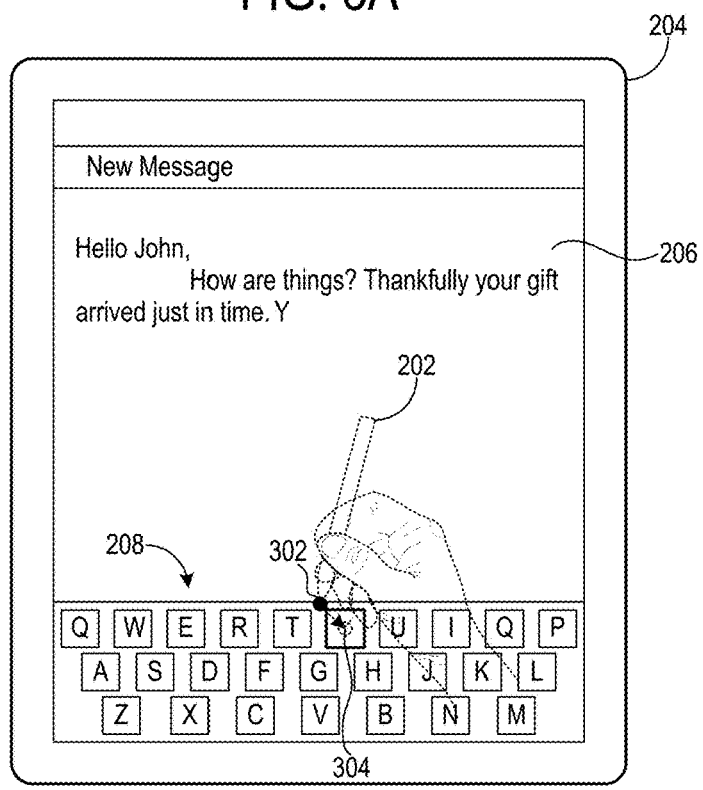

FIGS. 3A and 3B show another example adjustment made to a displayed response to a touch input based upon a probabilistic determination of an intended touch location. As seen in FIG. 3A, touch input is applied by stylus 202 to touch-sensitive computing device 204 at a sensed location 302. Like sensed location 210, sensed location 302 lies between the 'Y' and 'T' keys. In this example, unlike that of FIGS. 2A and 2B, sensed location 302 matches a physical location at which the touch occurs. However, due to optical parallax, the user touches the display at an incorrect location, perceiving the touch to be within the 'Y' key. In this example, a probabilistic determination performed for the 'Y' key yields a probability higher than that yielded by a probabilistic determination performed for the 'T' key. Accordingly, the 'Y' key is selected as the intended touch location. Thus, the response to the touch input is displayed at an adjusted location 304 having an offset with both a different direction and magnitude than the offset applied in the example of FIG. 2A-2B.

In some implementations, a probabilistic determination may be further based on a context of a GUI presented by display 206. Any suitable contextual information may be utilized. As one example, each key of virtual keyboard 208 may have an associated frequency of selection. Thus, the frequency of selection may be used to weight the probabilistic determination, such that a more frequently selected key may be weighted more strongly than a less frequently selected key. As another example, the contextual information may comprise information regarding other user inputs received. For example, keys in virtual keyboard 208 that complete or otherwise match an incomplete word currently being input via the virtual keyboard 208 may be weighted higher than those that do not. As another example, adjustments to sensed touch locations may be determined based at least in part on the location on display 206 at which touch input was received—e.g., a different offset may be determined for inputs in an upper left quadrant of the display than for touch inputs received in a lower right quadrant of the display. Similarly, different statistical distributions may be used as inputs to probabilistic determinations depending on the location on display 206 at which a touch input is received.

The approaches described herein also may be applied to "hover" inputs in which the input device hovers above, but does not make physical contact with, the computing device. The terms "touch input" and the like as used herein refer to both physical contact and hover input. Thus, in some implementations, computing device 204 may sense an approach of an object (e.g., stylus, finger) to the touch sensitive display, and perform a plurality of probabilistic determinations of intended touch locations of the object at a sample rate as the object approaches the touch sensor. In some examples, probabilistic determinations may be determined during object approach for signals generated in the touch sensor by the object that exceed a threshold signal-to-noise ratio (SNR), and not for signals that fall below the threshold SNR.

Figure 4:
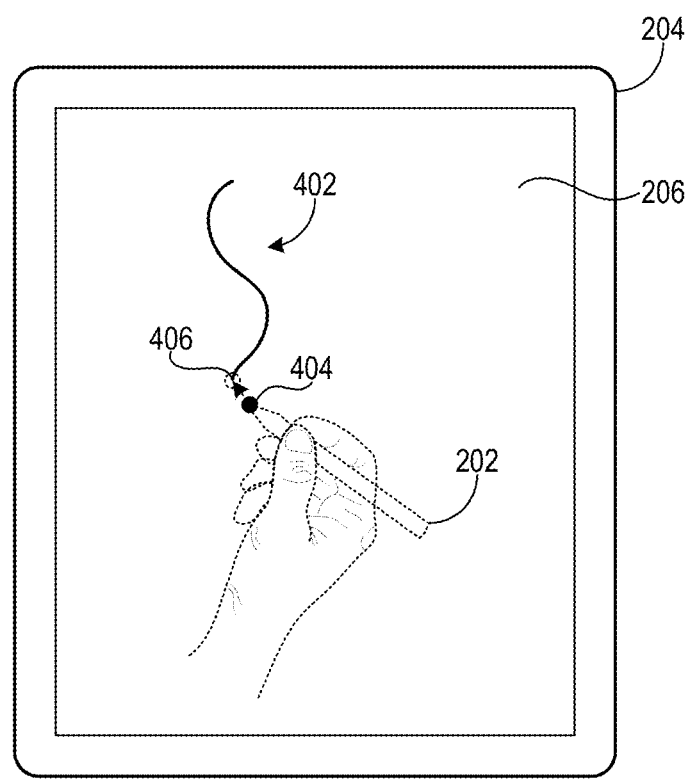
FIG. 4 shows a further example adjustment made to a sensed touch location based upon a probabilistic determination of a likely intended touch location.

FIG. 4 shows yet another example of an adjustment of a displayed response to a sensed touch input in accordance with an implementation of this disclosure. Here, a geometric shape 402 has been previously drawn on display 206 of computing device 204 in response to a free-form touch input by stylus 202, and the stylus was lifted from the display 206 after drawing shape 402. Stylus 202 is then brought in contact with display 206 once more, at a sensed location 404 that is separated from an endpoint 406 of shape 402. In response to receiving this touch input, a probabilistic determination of an intended touch location is performed based on sensed location 404 and shape 402, utilizing as an input the previously activated and currently active shape 402. Based on the probabilistic determination, it is determined that the intended touch location corresponds to a previously activated touch location or user interface element that is currently in an activated state—namely, endpoint 406 of previously made user input forming shape 402. In this way, touch input may be "snapped" to previously made user input, allowing in this example a user to resume drawing of shape 402. An example of implementing such a snap-to response is described in more detail below.

Figure 5A:
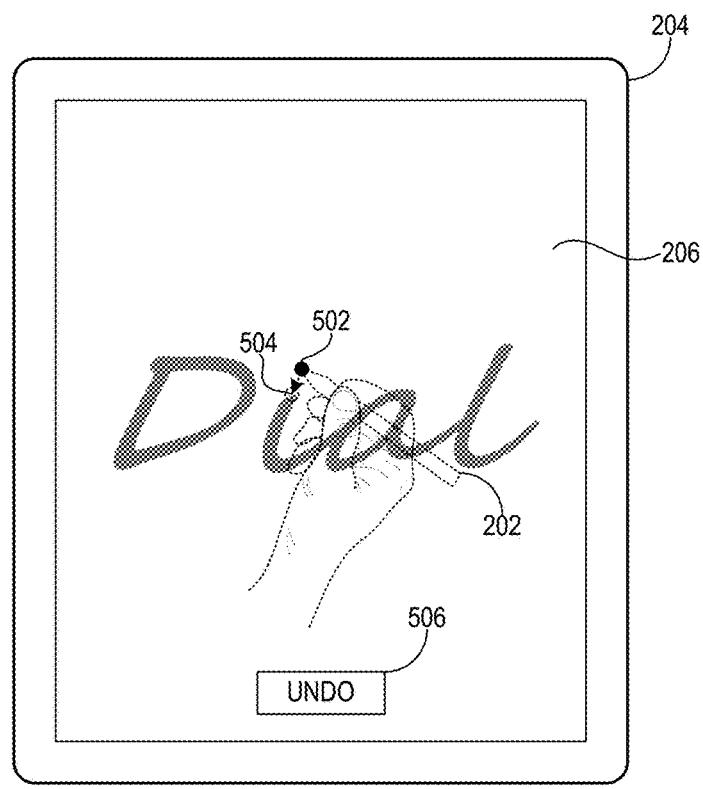
FIG. 5A shows still another example adjustment made to a sensed touch location based upon a probabilistic determination of a likely intended touch location.

FIG. 5A shows another example of an adjustment of a displayed response to a sensed touch input based upon a probabilistic determination of a likely intended touch location. In this example, the text "Dial", save for the dot above the 'i', has been displayed on display 206 of computing device 204 in response to touch input received via stylus 202. To complete the text and draw the dot above the 'i', touch input is applied at a sensed location 502 that is separated from the 'i'. In response to reception of this touch input, a probabilistic determination of an intended touch location may result in the displayed location snapping to the previously inked and still active terminus of the 'i'. Accordingly, it may be possible that a response to the touch input is displayed an adjusted location 504, such that the input erroneously snaps to the stem of the 'i'. However, in this instance, the user did not intend to make an input at the adjusted location 504. As such, the user may select to make a negating input indicating that the touch input was interpreted incorrectly. The negating input may be made in any suitable manner, such as by an undo button 506, a backspace button, operating stylus 202 as an eraser, etc.

Figure 5B:
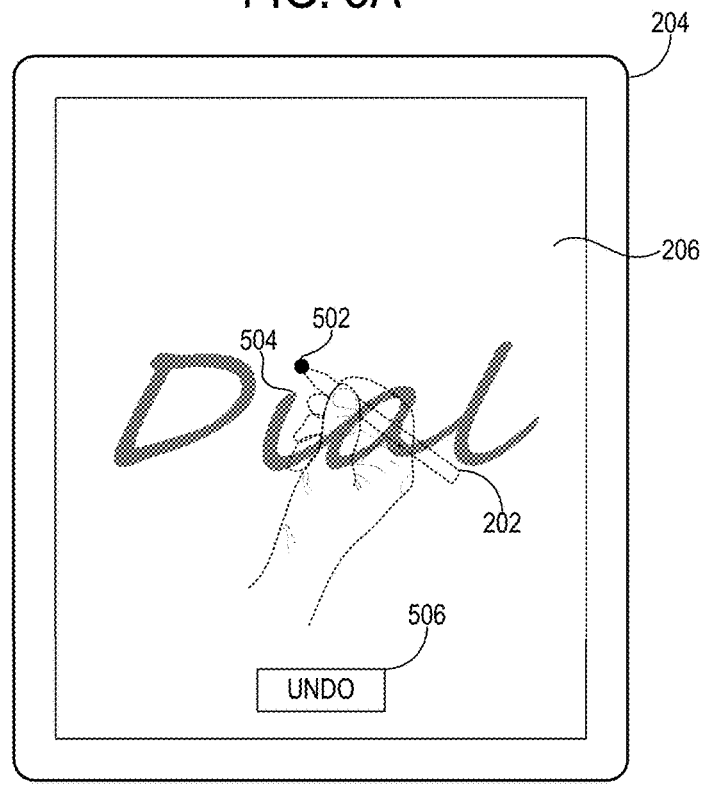
FIG. 5B illustrates a negating of the example adjustment of FIG. 5A via user input.

In response to receiving the negating input, the response to the touch input is again displayed at sensed location 502, as shown in FIG. 5B, allowing the display of a dot above the 'i'. Further, in some examples, the negating input also may switch off the probabilistic determination for one or more subsequent touch inputs, such that a response to the subsequent input is displayed at the sensed location, rather than at an adjusted location. In some implementations, controls may be displayed in the GUI presented by display 206 allowing a user to explicitly turn touch input touch input location adjusting and/or snapping on and off.

Figure 6:
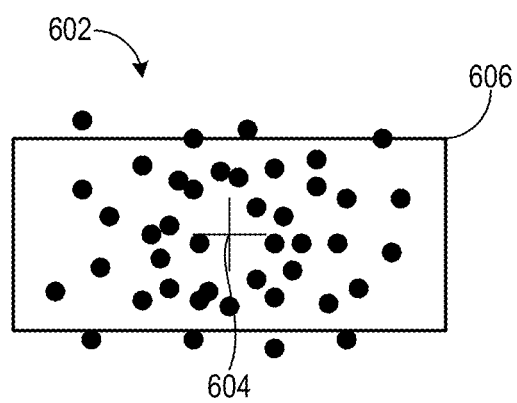
FIG. 6 schematically illustrates an example set of touch location data that may be used to perform a probabilistic determination of a likely intended touch location in accordance with an implementation of this disclosure.

As mentioned above, a probabilistic determination of a likely intended touch location may utilize an input of a previously-determined set of touch input location data. FIG. 6 schematically illustrates an example of a previously-determined set of sensed input locations 602 around an intended touch location 604 that may be used as such a statistical distribution. In this example, intended touch location 604 may correspond, for example, to a center of a user interface element presented on a GUI.

The set of previously determined touch locations may be initially formed via testing, for example, during development of a touch sensing system. The data set further may be updated during based on touch inputs received via the touch sensor of computing device 204. For example, observed distances and directions between sensed touch locations and frequently selected keys in virtual keyboard 208 may be added to existing distances between sensed touch locations 602 and intended touch location 604, as long as the touches were not negated. When updating the data set, frequently selected user interface elements may be used for data acquisition so as to obtain more data per unit time. Likewise, user interface elements at different displayed locations may be selected, as dispersion characteristics may vary depending upon screen location. A normal distribution of the dispersion may be assumed in some implementations, and parameters such as distance mean and standard deviation (as well as other device parameters, such as an angle of a stylus) may be updated periodically.

The statistical distribution also may be based upon other criteria. The criteria may include, for example, the size of stylus 202 (e.g., size of a tip of the stylus) and/or the angle at which the stylus is oriented relative to the surface of computing device 204. The statistical distribution may also vary depending on the size, shape, and/or type of user interface element to which its distances are associated. Moreover, two or more statistical distributions may be used as inputs to probabilistic determinations performed on computing device 204. For example, the statistical distribution used for a given probabilistic determination may vary depending on the location at which a touch input is received on the computing device.

Figure 7:
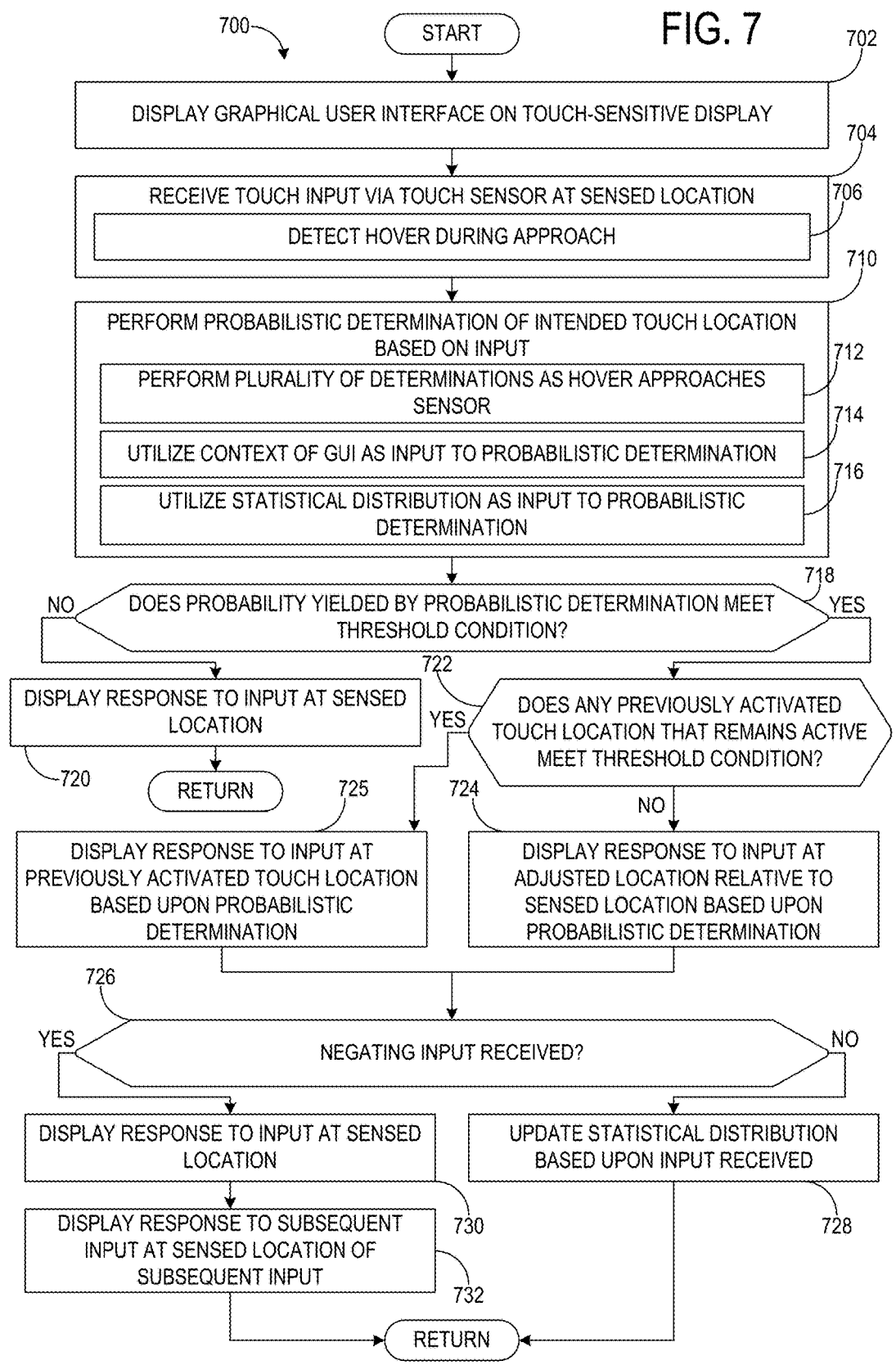
FIG. 7 shows a flowchart illustrating a method for determining a likely intended touch location in accordance with an implementation of this disclosure.

FIG. 7 shows a flowchart illustrating a method 700 for probabilistically determining an intended touch location in accordance with an implementation of this disclosure. Method 700 may be performed on a computing device via execution of instructions stored in a storage subsystem of the computing device.

At 702, method 700 comprises displaying a GUI on a touch-sensitive display (e.g., display 206 of FIG. 2) of a computing device (e.g., computing device 204 of FIG. 2). The GUI may or may not include one or more user interface elements, such as one or more keys of a virtual keyboard (e.g., virtual keyboard 208 of FIG. 2). At 704, a touch input is received via a touch sensor of the computing device at a sensed location. In some examples, the touch may be a physical touch on the surface of the touch-sensitive display. In other examples, receiving the touch input may include, at 706, detecting hover input from an object as the object approaches the touch sensor.

Continuing, at 710, method 700 comprises performing a probabilistic determination of an intended touch location based on the touch input received at 704. In some implementations, a single, or fixed number of, probabilistic determination(s) may be performed for each sensed touch input as the touch input contacts a touch-sensitive display. In other implementations, performing the probabilistic determination may include, at 712, performing a plurality of probabilistic determinations of intended touch locations at a sample rate, for example as a hover input approaches the touch sensor. In such implementations, the probabilistic determinations may be performed based on whether signals induced in the touch sensor by the hover input exceed a threshold SNR, as described above. Further, in some implementations, as indicated at 714, the probabilistic determination may utilize a context of the GUI displayed at 702 as input, as described above. Additionally, in some examples, the probabilistic determination may include, at 716, utilizing a statistical distribution comprising a set of touch locations (e.g. in the form of offsets) relative to a possible intended touch location as an input to the probabilistic distribution.

In some implementations, method 700 may comprise, at 718, determining whether an outcome yielded by the probabilistic determination performed at 710 meets a threshold condition, such as a minimum probability. In other implementations, such a threshold may not be applied.

Continuing, if it is determined that the probability yielded by the probabilistic determination does not exceed the threshold condition, method 700 proceeds to 720, where a response to the touch input is displayed at the sensed location. On the other hand, if it is determined that the probability yielded by the probabilistic determination does exceed the threshold condition, method 700 optionally proceeds to 722, where it is determined whether any previously activated touch input locations that are currently active meet a threshold condition (e.g. threshold distance, threshold probability, etc.). If there are no previously activated touch input locations that are currently active and that meet the threshold condition, then a response to the touch input is displayed at an adjusted location corresponding to the outcome of the probabilistic determination at 718. On the other hand, if there are such previously activated touch input locations, then method 700 comprises, at 725, displaying a response to the touch input at an adjusted location corresponding to the previously activated touch location, as indicated at 724.

As mentioned above, in some instances a probabilistic determination of a likely intended touch location may result in an adjustment that does not match an actual intent of the user. In such instances, a user may negate the adjustment. As such, method 700 comprises, at 726, determining if a negating user input is received. If no negating user input is received, the statistical distribution utilized for the probabilistic determination may be updated at 728 based on the touch input received at 704. If, however, a negating input has been received, then method 700 proceeds to 730 where a response to the negating input is displayed at the sensed location. Further, at 732, a response to a subsequent touch input also may be displayed at a sensed location.

In some embodiments, the methods and processes described herein may be tied to a computing device of one or more computing devices. In particular, such methods and processes may be implemented as a computer-application program or service, an application-programming interface (API), a library, and/or other computer-program product.

Figure 8:
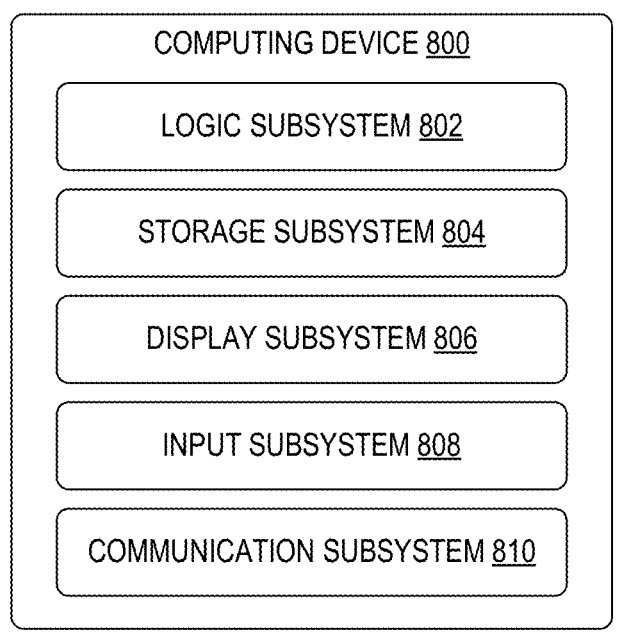
FIG. 8 shows a block diagram of a computing device in accordance with an implementation of this disclosure.

FIG. 8 schematically shows a non-limiting embodiment of a computing device 800 that may enact one or more of the methods and processes described above. Computing device 800 is shown in simplified form. Computing device 800 may take the form of one or more personal computers, server computers, tablet computers, home-entertainment computers, network computing devices, gaming devices, mobile computing devices, mobile communication devices (e.g., smart phone), and/or other computing devices having touch screens (e.g. appliances such as thermostats, alarms, kitchen appliances, automobile computers, other things with embedded touch screen-controlled computing devices, etc.).

Computing device 800 includes a logic subsystem 802 and a storage subsystem 804. Computing device 800 may optionally include a display subsystem 806, input subsystem 808, communication subsystem 810, and/or other components not shown in FIG. 8.

Logic subsystem 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 804 includes one or more physical devices configured to hold instructions executable by the logic machine to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "method" and "program" may be used to describe an aspect of computing device 800 implemented to perform a particular function. In some cases, a method or program may be instantiated via logic subsystem 802 executing instructions held by storage subsystem 804. It will be understood that different methods and/or programs may be instantiated from the same application, service, code block, object, library, routine, API, function, etc. Likewise, the same method and/or program may be instantiated by different applications, services, code blocks, objects, routines, APIs, functions, etc. The terms "method" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

Display subsystem 806 may be used to present a visual representation of data held by storage subsystem 804. This visual representation may take the form of a GUI. As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

Input subsystem 808 may comprise or interface with one or more user-input devices such as a touch-sensitive display screen, keyboard, mouse, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing device 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing device 800 to send and/or receive messages to and/or from other devices via a network such as the Internet.

It will be understood that the configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch-sensitive computing device, comprising:
a logic subsystem; and
a storage subsystem holding instructions executable by the logic subsystem to
display a graphical user interface on a display of the touch-sensitive computing device,
receive a touch input via a touch sensor of the touch-sensitive computing device at a sensed location,
operate a touch sensing system to perform a probabilistic determination of an intended touch location based on the touch input by utilizing a statistical distribution of a previously-determined set of sensed touch input locations as an input to the probabilistic determination, the previously-determined set of sensed touch input locations comprising a testing data set formed during development of the touch sensing system, and
display a response to the touch input at an adjusted location on the graphical user interface that is adjusted relative to the sensed location based upon the probabilistic determination.

2. The touch-sensitive computing device of claim 1, wherein displaying the response includes displaying the response at the adjusted location if a probability yielded by the probabilistic determination meets a threshold condition, and displaying the response at the sensed location if the probability does not meet the threshold condition.

3. The touch-sensitive computing device of claim 2, wherein the threshold condition is based on a distance between the sensed location and the intended touch location.

4. The touch-sensitive computing device of claim 1, wherein the instructions are further executable to
after displaying the response at the adjusted location, receive a negating input via the touch sensor,
in response to the negating input, display a response to the touch input at the sensed location, and
display a response to a subsequent touch input received via the touch sensor at a sensed location of the subsequent touch input.

5. The touch-sensitive computing device of claim 1, wherein the instructions are further executable to sense an approach of an object to the touch sensor, and
perform a plurality of probabilistic determinations of intended touch locations of the object at a sample rate as the object approaches the touch sensor.

6. The touch-sensitive computing device of claim 1, wherein the probabilistic determination is further based on a context of the graphical user interface.

7. The touch-sensitive computing device of claim 6, wherein the context comprises information regarding one or more keys in a virtual keyboard displayed on the graphical user interface.

8. The touch-sensitive computing device of claim 1, wherein the statistical distribution comprises a set of distances between the previously-determined set of sensed touch input locations and the intended touch location.

9. The touch-sensitive computing device of claim 1, wherein the instructions are further executable to update the statistical distribution based on touch inputs received via the touch sensor.

10. The touch-sensitive computing device of claim 1, wherein the instructions are executable to utilize a different statistical distribution depending on the location at which the touch input was received.

11. The touch-sensitive computing device of claim 1, wherein the intended touch location corresponds to a previously activated touch location that is currently in an active state.

12. A touch-sensitive computing device, comprising:
a logic subsystem; and
a storage subsystem holding instructions executable by the logic subsystem to
display a plurality of user interface elements in a user interface via a touch-sensitive display of the touch-sensitive computing device,
receive user input via the touch-sensitive display,
operate a touch sensing system to perform a probabilistic determination to determine, for each of two or more of the plurality of user interface elements, a probability of the user input received being intended for the user interface element, the probabilistic determination utilizing a statistical distribution of a previously-determined set of sensed touch input locations as an input, the previously-determined set of sensed touch input locations comprising a testing data set formed during development of the touch sensing system, and
display a selection of a selected user interface element based upon the probabilistic determination.

13. The touch-sensitive computing device of claim 12, wherein displaying the selection of the selected user interface element includes displaying the selection at an adjusted location that is adjusted relative to a sensed location at which the user input was received if the probabilistic determination meets a threshold condition, and displaying the selection at the sensed location if the probabilistic determination does not meet the threshold location.

14. The touch-sensitive computing device of claim 13, wherein the instructions are further executable to,
after displaying the selection of the selected user interface element at the adjusted location, receive a negating input via the touch-sensitive display, and in response to the negating input, display the selection at the sensed location.

15. The touch-sensitive computing device of claim 12, wherein the instructions are further executable to
sense an approach of an object to the touch-sensitive display, and
perform a plurality of probabilistic determinations of intended touch locations of the object at a sample rate as the object approaches the touch sensor.

16. The touch-sensitive computing device of claim 12, wherein the probabilistic determination is further based on a context of the user interface.

17. The touch-sensitive computing device of claim 12, wherein the selected user interface element is a previously activated user interface element that is currently in an activated state.

18. The touch-sensitive computing device of claim 17, wherein the previously activated user interface element is an endpoint of a previously made user input.

19. A method of receiving user input via a graphical user interface presented by a computing device, the method comprising:
receiving a first stylus touch input having a first touch location;
operate a touch sensing system by performing a probabilistic determination of a first intended touch location based upon the first touch location and one or more user interface elements displayed when the first stylus touch input is received, the probabilistic determination of the first intended touch location utilizing a statistical distribution of a previously-determined set of sensed touch input locations as an input, the previously-determined set of sensed touch input locations comprising a testing data set formed during development of the touch sensing system;
displaying at the first intended touch location a response to the first touch stylus input received by applying a first offset;
receiving a second stylus touch input having a second touch location;
performing a probabilistic determination of a second intended touch location based upon the second touch location and one or more user interface elements displayed when the second stylus touch input is received; and
displaying at the second intended touch location a response to the second stylus touch input received by applying a second offset to the second touch location, the second offset being different from the first offset.

20. The method of claim 19, wherein the first offset comprises a first distance and a first direction, and wherein the second offset comprises a second distance and a second direction, the first distance being different from the second distance and the first direction being different from the second direction.

* * * * *